US012736443B2

(12) United States Patent
Park et al.

(10) Patent No.: US 12,736,443 B2
(45) Date of Patent: Sep. 15, 2026

(54) AIR PURIFIER

(71) Applicant: SAMSUNG ELECTRONICS CO., LTD., Suwon-si (KR)

(72) Inventors: Changhyun Park, Suwon-si (KR); Nakhyun Kim, Suwon-si (KR); Juyoung Kim, Suwon-si (KR); Juwan Park, Suwon-si (KR); Moonsun Shin, Suwon-si (KR); Wonhee Lee, Suwon-si (KR); Sekwan Jeong, Suwon-si (KR); Changwoo Jung, Suwon-si (KR); Sunghyun Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 477 days.

(21) Appl. No.: 18/107,574

(22) Filed: Feb. 9, 2023

(65) Prior Publication Data

US 2023/0184635 A1 Jun. 15, 2023

Related U.S. Application Data

(63) Continuation of application No. PCT/KR2021/009911, filed on Jul. 29, 2021.

(30) Foreign Application Priority Data

Sep. 29, 2020 (KR) ........................ 10-2020-0127032

(51) Int. Cl.
*G01N 1/24* (2006.01)
*B01D 46/00* (2022.01)
(Continued)

(52) U.S. Cl.
CPC ........... *G01N 1/24* (2013.01); *B01D 46/0047* (2013.01); *B01D 46/12* (2013.01); *B01D 46/442* (2013.01);
(Continued)

(58) Field of Classification Search
CPC .. G01N 1/24; G01N 15/06; G01N 2015/0046; B01D 46/0047; B01D 46/12;
(Continued)

(56) References Cited

U.S. PATENT DOCUMENTS 11,452,961 B2 9/2022 Mun et al.
11,525,588 B2 12/2022 Kim et al.
(Continued)

FOREIGN PATENT DOCUMENTS

CN 106839140 A * 6/2017 ......... B01D 46/4245
JP 2551836 Y2 10/1997
(Continued)

OTHER PUBLICATIONS

International Search Report issued in International Application No. PCT/KR2021/009911 dated Nov. 24, 2021.
(Continued)

*Primary Examiner* — Stephanie E Bloss
*Assistant Examiner* — Kevin C Butler
(74) *Attorney, Agent, or Firm* — STAAS & HALSEY LLP

(57) ABSTRACT

An air cleaner including a case comprising an upper surface and a side surface, a sensor to measure a degree of contamination of air introduced into the case, a round portion in a shape that is curved on the upper surface of the case, and a sensor air inlet on the round portion and through which air is introduced.

9 Claims, 16 Drawing Sheets

(51) Int. Cl.

| | |
|---|---|
| ***B01D 46/12*** | (2022.01) |
| ***B01D 46/44*** | (2006.01) |
| ***B01D 53/00*** | (2006.01) |
| ***B01D 53/86*** | (2006.01) |
| ***F24F 8/108*** | (2021.01) |
| ***F24F 8/167*** | (2021.01) |
| ***F24F 8/22*** | (2021.01) |
| ***F24F 13/20*** | (2006.01) |
| ***F24F 110/64*** | (2018.01) |
| ***F24F 110/65*** | (2018.01) |
| ***G01N 15/00*** | (2024.01) |
| ***G01N 15/06*** | (2024.01) |

(52) U.S. Cl.

CPC ........... *B01D 53/007* (2013.01); *B01D 53/86* (2013.01); *F24F 13/20* (2013.01); *G01N 15/06* (2013.01); *B01D 2255/802* (2013.01); *B01D 2259/804* (2013.01); *B01D 2273/30* (2013.01); *B01D 2279/65* (2013.01); *F24F 8/108* (2021.01); *F24F 8/167* (2021.01); *F24F 8/22* (2021.01); *F24F 2013/205* (2013.01); *F24F 2110/64* (2018.01); *F24F 2110/65* (2018.01); *G01N 2015/0046* (2013.01)

(58) Field of Classification Search

CPC .... B01D 46/442; B01D 53/007; B01D 53/86; B01D 2255/802; B01D 2255/804; B01D 2255/30; B01D 2255/65; F24F 13/20; F24F 2110/64; F24F 2110/65; F24F 8/167; F24F 8/22; F24F 8/108; F24F 2013/205

USPC ........................................................ 73/28.01

See application file for complete search history.

(56) References Cited

U.S. PATENT DOCUMENTS

D1,031,969 S * 6/2024 Zhang .......................... D23/260
D1,048,022 S * 10/2024 Huffstetler ................... D23/364
2006/0201119 A1 9/2006 Song
2012/0145010 A1* 6/2012 Yamamoto ............. F24F 8/108 96/397
2017/0234598 A1* 8/2017 Yun ....................... F25D 29/006 96/397
2019/0195792 A1* 6/2019 Ryu .................. G01N 21/3518
2020/0284449 A1* 9/2020 Kim .................. B60H 1/00428
2020/0386423 A1 12/2020 Chu et al.
2023/0272932 A1* 8/2023 Kim ....................... B01D 46/10 96/405
2023/0408380 A1* 12/2023 Maggio ................ G01N 1/2273
2024/0085040 A1* 3/2024 Chu ........................ F24F 8/108

FOREIGN PATENT DOCUMENTS

JP 10-66817 A 3/1998
JP 11-211199 A 8/1999
JP 2000-420 A 1/2000
JP 2001170145 A * 6/2001
JP 4310873 B2 * 8/2009
JP 4878213 B2 * 2/2012
JP 6022724 B1 * 11/2016 .............. F24F 13/28
JP 2007307508 A * 10/2017
JP 2017180900 A * 10/2017 .............. F24F 13/28
KR 10-2006-0100493 A 9/2006
KR 10-2010-0010280 A 2/2010
KR 20100010280 A * 2/2010 ............. B01D 46/44
KR 101006820 B1 * 1/2011 ........... B01D 46/004
KR 10-1512664 B1 4/2015
KR 10-2017-0083793 7/2017
KR 10-1799951 B1 11/2017
KR 101803628 B1 * 12/2017 .............. F24F 13/28
KR 10-1828936 B1 3/2018
KR 10-2019-0072368 A 6/2019
KR 10-2019-0129335 A 11/2019
KR 10-2020-0001061 A 1/2020
KR 20210129887 A * 10/2021 .............. F24F 8/108
KR 10-2401292 B1 5/2022

OTHER PUBLICATIONS

Written Opinion issued in International Application No. PCT/KR2021/009911 dated Nov. 24, 2021.

Notice of Preliminary Rejection issued Feb. 13, 2025 for International Application No. 10-2020-0127032.

Office Action dated Sep. 22, 2025 issued in Korean Application No. 10-2020-0127032.

Office Action dated Apr. 20, 2026 issued in Korean Application No. 10-2020-0127032.

* cited by examiner

AIR PURIFIER

CROSS-REFERENCE TO RELATED APPLICATION

This application is a continuation application, under 35 U.S.C. § 111(a), of international application No. PCT/KR2021/009911, filed on Jul. 29, 2021, which claims priority under 35 U. S. C. § 119 to Korean Patent Application No. 10-2020-0127032, filed Sep. 29, 2020, the disclosures of which are incorporated herein by reference in their entirety.

BACKGROUND

Field

The present disclosure relates to an air cleaner, and more particularly, to an air cleaner including a dust sensor and a gas sensor.

Discussion of Related Art

An air cleaner is a device that sucks contaminated air, filters out dust and odor particles contained in air to purify the sucked air into clean air, and discharges the purified air to the outside of the air cleaner.

In order to control an operation of the air cleaner, a sensor is installed inside the air cleaner to measure a degree of contamination of air around the air cleaner. For example, a dust sensor, a carbon monoxide sensor, a carbon dioxide sensor, a temperature sensor, a humidity sensor, an odor sensor, and the like may be installed.

SUMMARY

An aspect of the present disclosure provides an air cleaner including a case including an upper surface and a side surface, a sensor unit to measure a degree of contamination of air introduced into the case, a round portion, in a shape that is curved, on the upper surface of the case, and a sensor air inlet, on the round portion and through which the air is introduced into the case.

The sensor unit may include a sensor cover that allows the air having passed through the sensor air inlet to pass through, and at least one of a dust sensor and a gas sensor inside the sensor cover to measure concentration of dust and concentration of gas in the air, respectively.

The sensor unit may include the dust sensor and the gas sensor, and the sensor cover may include a first cover in which the dust sensor is provided, and a second cover in which the gas sensor is provided.

The sensor cover may further include a connection member to connect the first cover and the second cover so that the first cover and the second cover are integrally formed.

The first cover may include a first inlet part including a first inlet port through which the air is introduced so that the dust sensor measures the concentration of dust in the air, a first flow path part connected to the first inlet part so that the air introduced into the first inlet port reaches the dust sensor, and an accommodating portion, connected to the first flow path part, to accommodate the dust sensor.

The first inlet port may be open along a lateral direction of the case.

The first inlet part may have a shape curved along the round portion.

The first inlet part may include a rib that forms a step inside the first inlet port to prevent foreign substances from being introduced into the first inlet port.

One side of the accommodating portion may be open such that the dust sensor is inserted therethrough.

The dust sensor may include a casing, a suction port on one side of the casing to allow the air to be introduced therethrough, a dust sensing part inside the casing to measure the dust concentration in the air, and a discharge port on another side of the casing through which the air is discharged subsequent to the dust concentration being measured by the dust sensing part.

The dust sensor may further include a fan inside the casing to suck the air into the suction port.

The accommodating portion may include a hole at a position corresponding to the discharge port to allow the air discharged through the discharge port to be discharged to an outside of the sensor cover.

The second cover may include a second inlet part including a second inlet port through which the air is introduced so that the gas sensor measures the concentration of gas in the air, and a second flow path part connected to the second inlet part so that the air introduced into the second inlet port reaches the gas sensor, wherein the gas sensor may be fixed to a rear surface of the second flow path part.

The second inlet port may be open along a lateral direction of the case.

The second inlet part may have a shape curved along the round portion.

The case may include an upper panel forming the upper surface and the round portion, and a side panel forming the side surface.

The case may further include a filter to filter out dust contained in the air introduced into the case, a filter case to which the filter is coupleable and decoupleable, a fan case coupleable to the filter case and to which a blowing fan to guide air passed through the filter is coupleable, and a frame coupleable to the fan case to allow the air passed through the filter to be discharged.

The sensor unit may further include a fastening part including a fastening hole to which an outer surface of the frame is to be fastened.

An aspect of the present disclosure provides an air cleaner including a case including an upper surface and a side surface, an air inlet hole on the side surface of the case and through which air is introduced, a sensor unit to measure a degree of contamination of air introduced into the case, a round portion in a shape that is curved on the upper surface of the case, and a sensor air inlet on the round portion and through which air is introduced into the case.

The sensor unit may include an opening through which air is introduced at a position corresponding to the air inlet hole.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
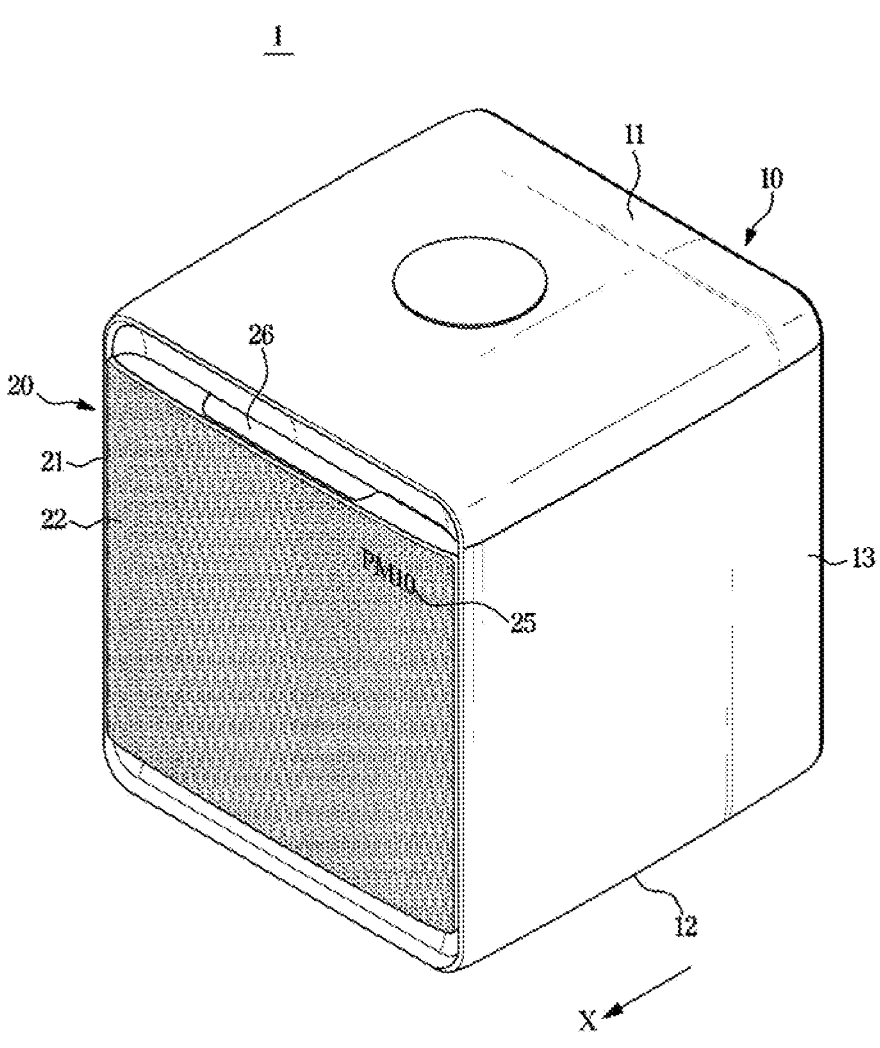
FIG. 1 is a front perspective view of an air cleaner according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context dearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms, and these terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

An aspect of the present disclosure provides an air cleaner in which a sensor air inlet is provided on a round portion of an upper surface thereof.

Another aspect of the present disclosure provides an air cleaner capable of measuring dust concentration and gas concentration regardless of installation position.

According to the present disclosure, even when an air cleaner is installed in close contact with a wall surface or furniture, dust concentration and gas concentration can be normally measured regardless of installation position.

In addition, even when an object is placed on top of the air cleaner, a sensor air inlet is not blocked, so that a sensor in the air cleaner can measure a degree of contamination of air.

Hereinafter, embodiments of the present disclosure will be described in detail with reference to the accompanying drawings.

Figure 2:
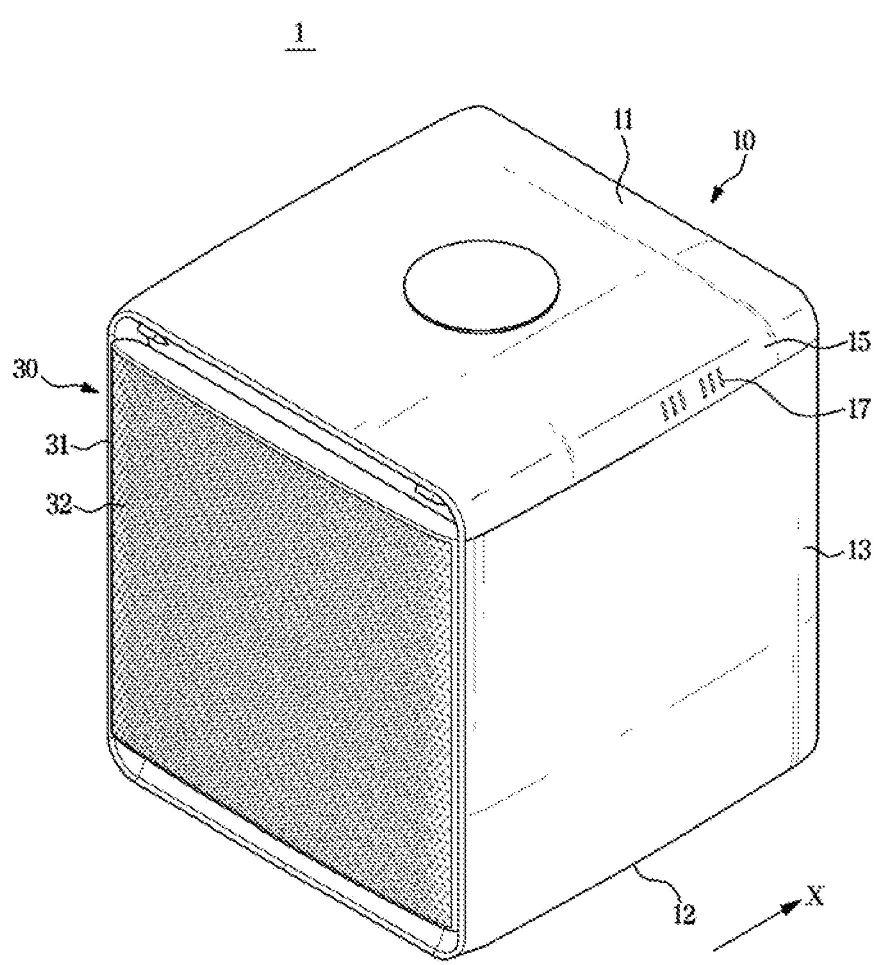
FIG. 2 is a rear perspective view of the air cleaner according to an embodiment of the present disclosure.
Figure 3:
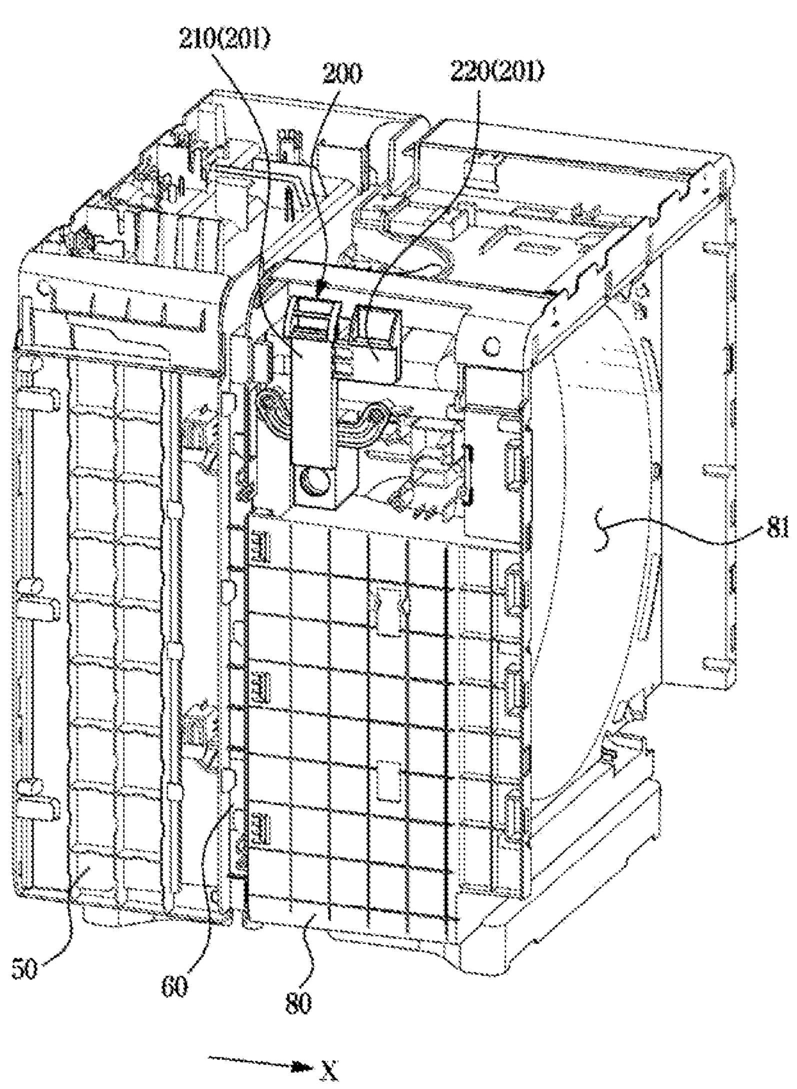
FIG. 3 is a perspective view of the air cleaner excluding a panel according to an embodiment of the present disclosure.
Figure 4:
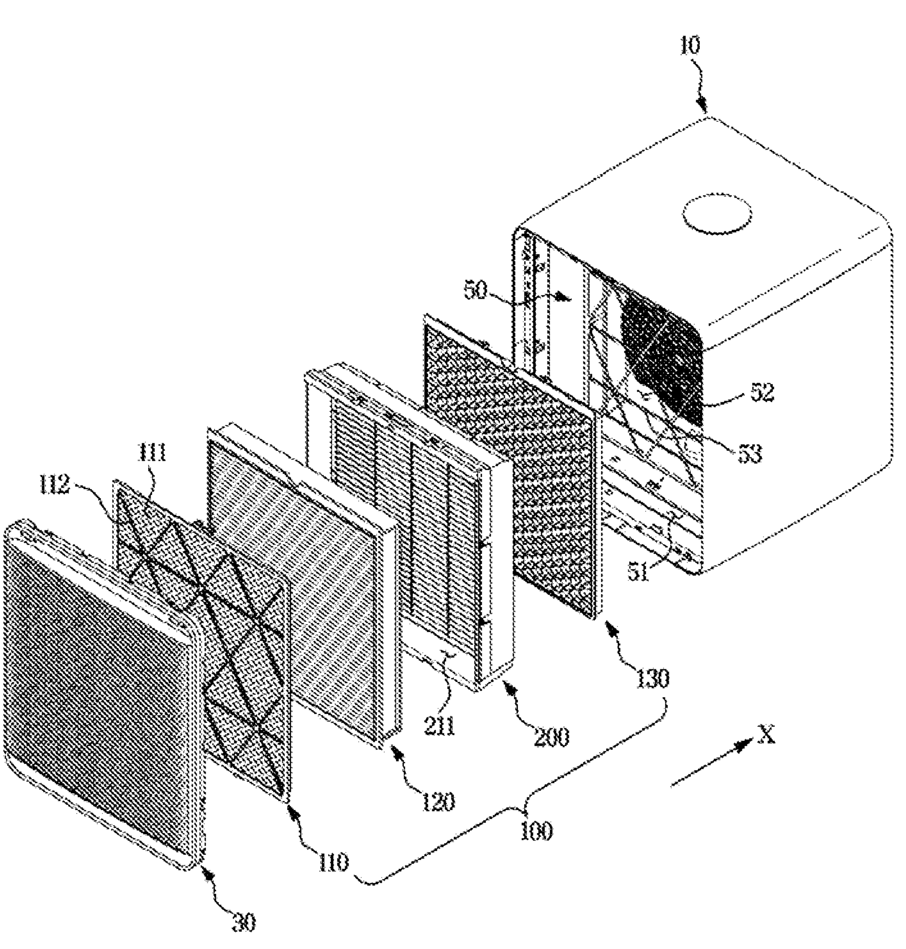
FIG. 4 is a schematic exploded perspective view of the air cleaner according to an embodiment of the present disclosure.
Figure 5:
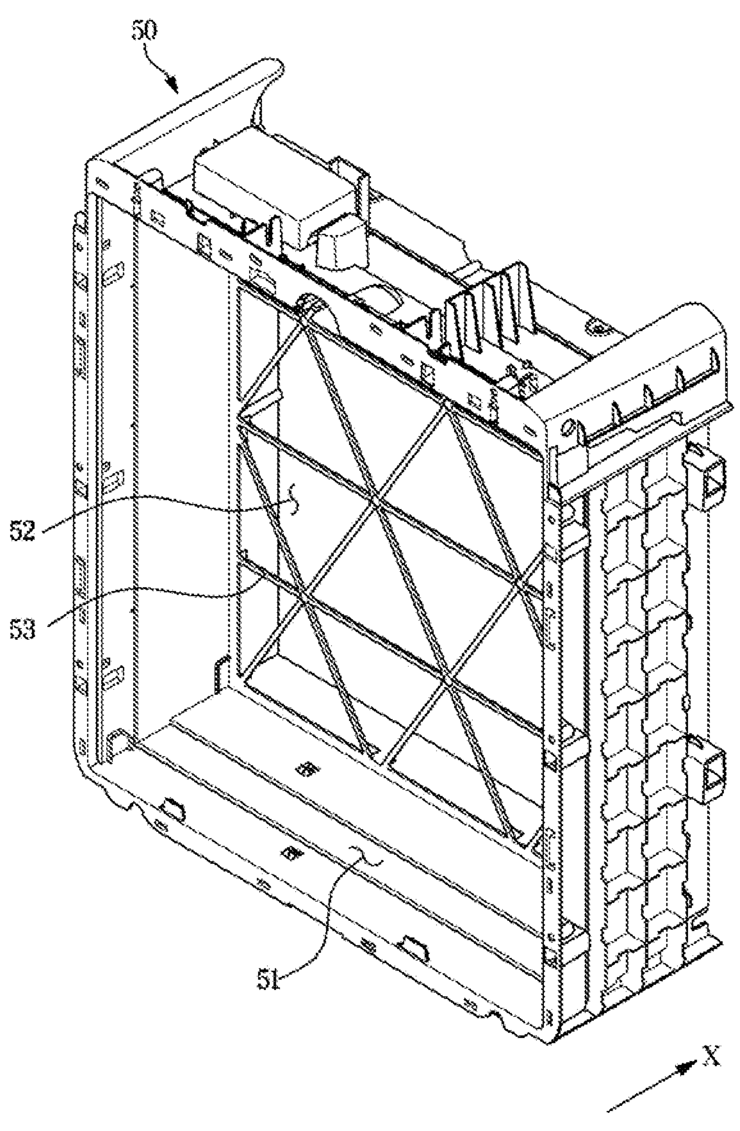
FIG. 5 is a view illustrating a fan case and a blowing fan separated from each other in the air cleaner according to an embodiment of the present disclosure.
Figure 6:
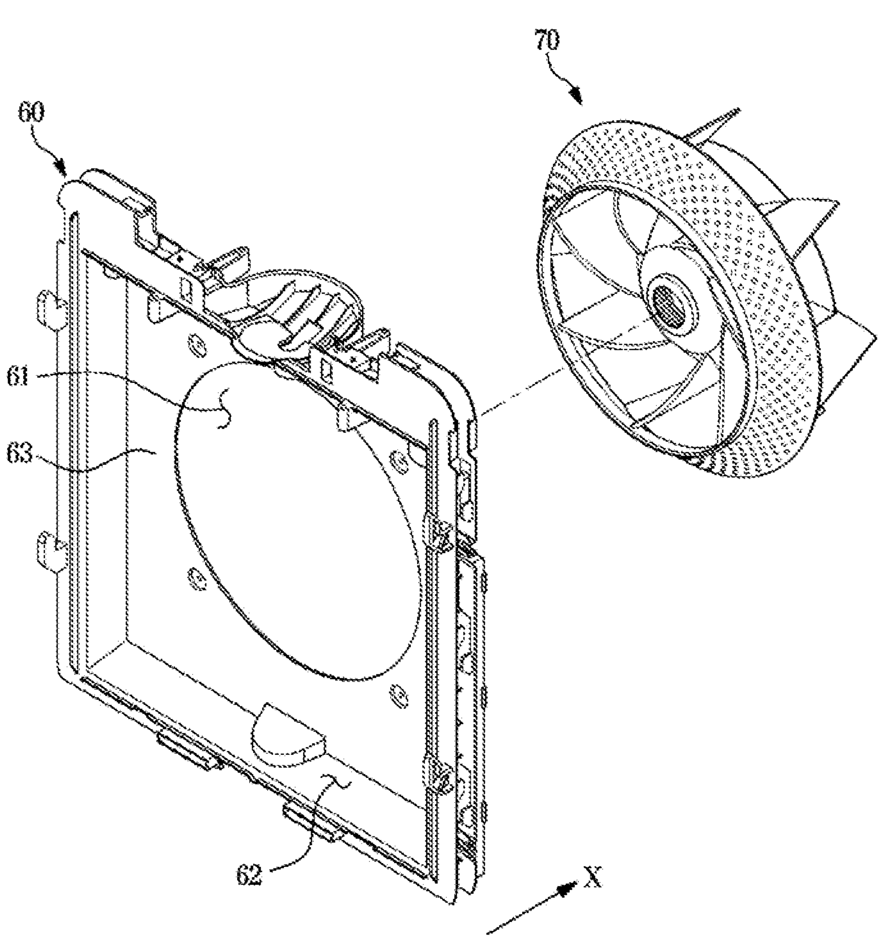
FIG. 6 is a view illustrating a filter case in the air cleaner according to an embodiment of the present disclosure.
Figure 7:
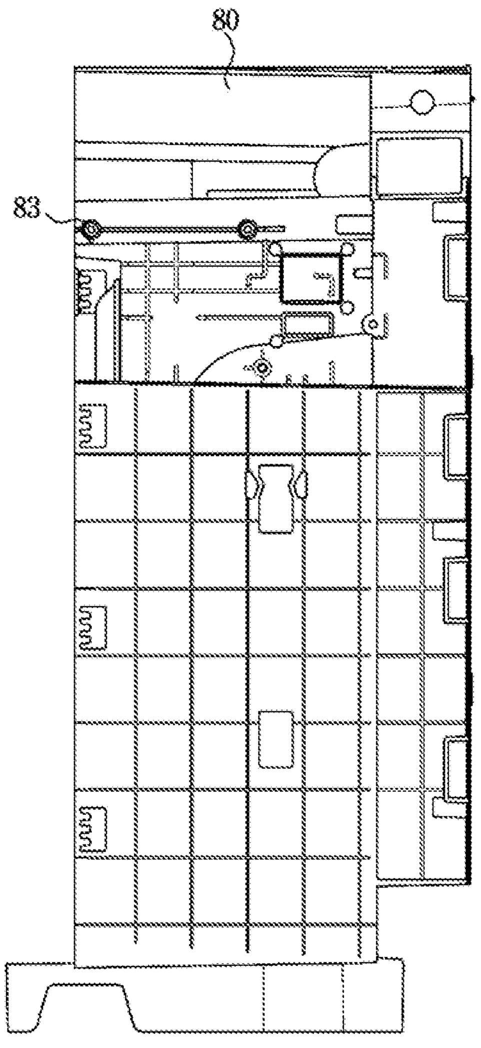
FIG. 7 is a view illustrating a frame in the air cleaner according to an embodiment of the present disclosure.

FIG. 1 is a front perspective view of an air cleaner according to an embodiment of the present disclosure, FIG. 2 is a rear perspective view of the air cleaner according to an embodiment of the present disclosure, FIG. 3 is a perspective view of the air cleaner excluding a panel according to an embodiment of the present disclosure, FIG. 4 is a schematic exploded perspective view of the air cleaner according to an embodiment of the present disclosure, FIG. 5 is a view illustrating a fan case and a blowing fan separated from each other in the air cleaner according to an embodiment of the present disclosure, FIG. 6 is a view illustrating a filter case in the air cleaner according to an embodiment of the present disclosure, and FIG. 7 is a view illustrating a frame in the air cleaner according to an embodiment of the present disclosure.

When an X direction shown in FIGS. 1 to 6 is referred to as a first direction, the first direction refers to a direction from the rear to the front.

Referring to FIGS. 1 and 2, an air cleaner 1 may include a case 10 forming an exterior, a front panel 20 coupled to a front of the case 10 to form a front surface of the air cleaner 1, and a rear panel 30 coupled to a rear of the case 10 to form a rear surface of the air cleaner 1.

The case 10 may include an upper panel 11 forming an upper surface, a lower panel 12 forming a lower surface, and side panels 13 forming both side surfaces. The front panel 20 and the rear panel 30 may be provided at the front and rear of the case 10, respectively.

The front panel 20 may be formed in a plate shape. A discharge part 21 for discharging air purified inside the case 10 may be provided on the front panel 20.

The discharge part 21 may include a discharge hole 22. The discharge hole 22 may be provided on the front surface of the front panel 20. The one or more discharge holes 22 may be formed. The number or locations of the discharge holes 22 are not limited, and may be provided such that air may be discharged in various directions. The front panel according to this embodiment is provided separately on the front of the case as an example, but the present disclosure is not limited thereto. For example, the front panel may be integrally formed with the case.

An operation button 26 provided to input an operation of the air cleaner 1 and a display 25 provided to display an operating state may be provided on the front panel 20.

The rear panel 30 may be formed in a plate shape having a size corresponding to the rear of the case 10. A suction part 31 provided to introduce outside air may be formed on the rear panel 30. The suction part 31 may include a plurality of suction holes 32 evenly distributed throughout the rear panel 30. The number or location of the suction holes 32 is not limited. For example, the plurality of suction holes 32 may be provided only in a partial region of the suction part 31.

The suction part 31 of the rear panel 30 may be formed such that outside air is introduced from the rear of the case 10 toward the inside of the case 10. The air introduced into the case 10 through the suction part 31 may be discharged through the discharge part 21 of the front panel 20. In other words, air may be introduced into the rear panel 30 of the case 10 in the first direction X and be discharged through the front panel 20.

As illustrated in FIG. 2, a round portion 15 formed in a curved shape may be provided on the upper surface of the case 10. The round portion 15 may be provided in a round shape.

In order for a sensor unit 200, which will be described later, to measure a degree of contamination of air around the air cleaner, a sensor air inlet through which air is introduced may be provided on the round portion 15. The one or more sensor air inlets 17 may be provided.

As the sensor air inlet is provided in the round portion 15, when an object is placed on the upper surface of the case 10, the sensor air inlet 17 may not be blocked by the object, so that air may be introduced into the air cleaner 1 through the sensor air inlet 17. In addition, even when the air cleaner 1 is placed on a wall surface, the wall surface does not block the sensor air inlet 17 provided on the round portion 15, so that air may be introduced into the air cleaner through the sensor air inlet 17 regardless of where the air cleaner 1 is installed.

Referring to FIGS. 3 to 7, the air cleaner 1 includes a filter device 100, a filter case 50, a fan case 60, a blowing fan 70, and a frame 80, which are installed inside the case 10.

The filter device 100 may be installed inside the case 10 to filter out dust in the air introduced through the suction part 31 of the rear panel 30. According to the present disclosure, the filter device 100 may also include an ultraviolet irradiation device 200 and a photocatalytic filter 130 to remove airborne bacteria and viruses.

According to an embodiment of the present disclosure, the filter device 100 may include a primary filter 110, a secondary filter 120, the ultraviolet irradiation device 200, and the photocatalytic filter 130.

The primary filter 110 may be provided to filter out dust in the air. The primary filter 110 may be disposed adjacent to the suction part 31. The primary filter 110 may include a pre-filter 111 provided to collect dust, foreign substances, etc. of a preset size or larger. The primary filter 110 may include filter supports 112 provided to support the pre-filter 111. The pre-filter 111 may be provided to cover an opening formed between the filter supports 112.

The primary filter 110 may be provided to be disposed most rearward in the first direction X in the case 10 among the components of the filter device 100.

The secondary filter 120 may be provided to collect foreign substances of a certain size that have passed through the primary filter 110. The secondary filter 120 may be a high efficiency particulate air (HEPA) filter collecting fine dust of the certain size. The HEPA filter may be composed of glass fibers. However, the secondary filter 120 is not limited thereto and may be provided as various types of filters in a manner of collecting foreign substances.

The secondary filter 120 may be disposed in front of the primary filter 110. The secondary filter 120 may be detachably mounted on the ultraviolet irradiation device 200. The secondary filter 120 may be mounted in a filter accommodating portion 211 formed in the ultraviolet irradiation device 200. The secondary filter 120 may be separated from the ultraviolet irradiation device 200. According to an embodiment of the present disclosure, the air cleaner 1 may operate even if the secondary filter 120 is not mounted in the ultraviolet irradiation device 200.

The filter case 50 may be provided to accommodate the filter device 100. In other words, the filter device 100 may be installed in the filter case 50. The filter case 50 may be coupled to be fixed inside the case 10. The filter case 50 accommodates the filter device 100 so that the filter device 100 may be fixed inside the case 10.

The filter case 50 may include a filter device accommodating portion 51 provided to accommodate the filter device 100. The filter device accommodating portion 51 may be formed by opening one side of the filter case 50. The filter device 100 may be detachably mounted on the filter device accommodating portion 51.

An air passing hole 52 formed to flow the air purified by passing through the filter device 100 and a rib 53 forming the air passing hole 52 and preventing the filter device 100 from escaping in front of the filter case 50 may be provided on the other side of the filter case 50. A plurality of the air passing holes 52 may be formed. The air passing hole 52 may be formed by the rib 53 provided on the other open side of the filter case 50. The air passing hole 52 forms an air flow path so that the air passed through the filter device 100 may move to the fan case 60. The air passed through the filter device 100 may move in the first direction X within the case 10 through the air passing holes 52. The filter device 100 may be fixed without movement in the first direction X within the filter case 50 by the ribs 53. By the ribs 53 and the air passing holes 52, the filter device 100 does not escape through the filter case 50 in the first direction X, and the air passed through the filter device 100 may pass through the filter case 50 in the first direction X.

According to an embodiment of the present disclosure, as illustrated in FIG. 4, a plurality of the air passing holes 52 may be provided. However, the present disclosure is not limited thereto, and a single air passing hole may be provided.

The fan case 60 may be disposed in front of the filter case 50. The blowing fan 70 may be coupled to the fan case 60. The blowing fan 70 may be coupled to the front of the fan case 60. The fan case 60 may include an opening 61 corresponding to the blowing fan 70 so that air is introduced into the blowing fan 70. The fan case 50 may include a partition wall portion 63 to prevent air from flowing into portions other than the opening 61. In addition, the fan case 60 may include a flow path 62 formed by four side walls and the partition wall portion 63. The flow path 62 may refer to an inner space of the fan case 60.

According to an embodiment of the present disclosure, air outside the air cleaner 1 may be introduced into the case 10 through the suction part 31 provided on the rear panel 30 of the case 10. In this case, the air outside the case 10 may be introduced into the case 10 by the blowing fan 70 that is rotated by a driving motor (not shown). The air introduced into the case 10 through the suction part 31 may pass through the primary filter 110 and the secondary filter 120. Dust in air may be filtered out while the air passes through the primary filter 110 and the secondary filter 120.

The frame 80 may be disposed in front of the fan case 60. The frame 80 may be provided to be coupled to the fan case 60. The frame 80 through which the air purified by passing through the filter 50 is discharged may include a discharge flow path 81 through which air is discharged. The discharge flow path 81 may refer to an inner space of the frame 80.

As illustrated in FIG. 3, the sensor unit 200 to measure the degree of contamination of the air introduced into the air cleaner may be coupled to the frame 80.

As illustrated in FIG. 7, the frame 80 may include a coupling member 83 for coupling with the sensor unit 200. The coupling member 83 may be provided on one side of the frame 80. The coupling member 83 of the frame 80 may be coupled with a fastening part 240 of the sensor unit 200. That is, the coupling member 83 of the frame 80 may be coupled with the fastening part 240 by passing through a fastening hole 241 of the fastening part 240 of the sensor unit 200.

Figure 8:
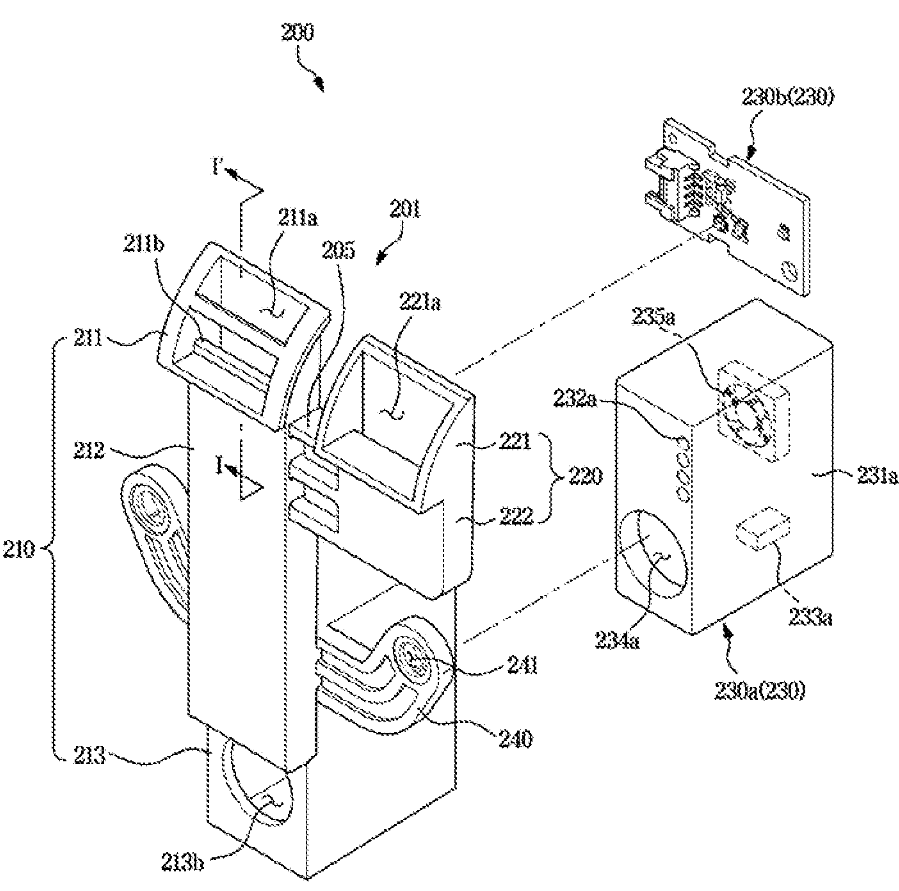
FIG. 8 is an exploded perspective view of a sensor unit in the air cleaner according to an embodiment of the present disclosure.
Figure 9:
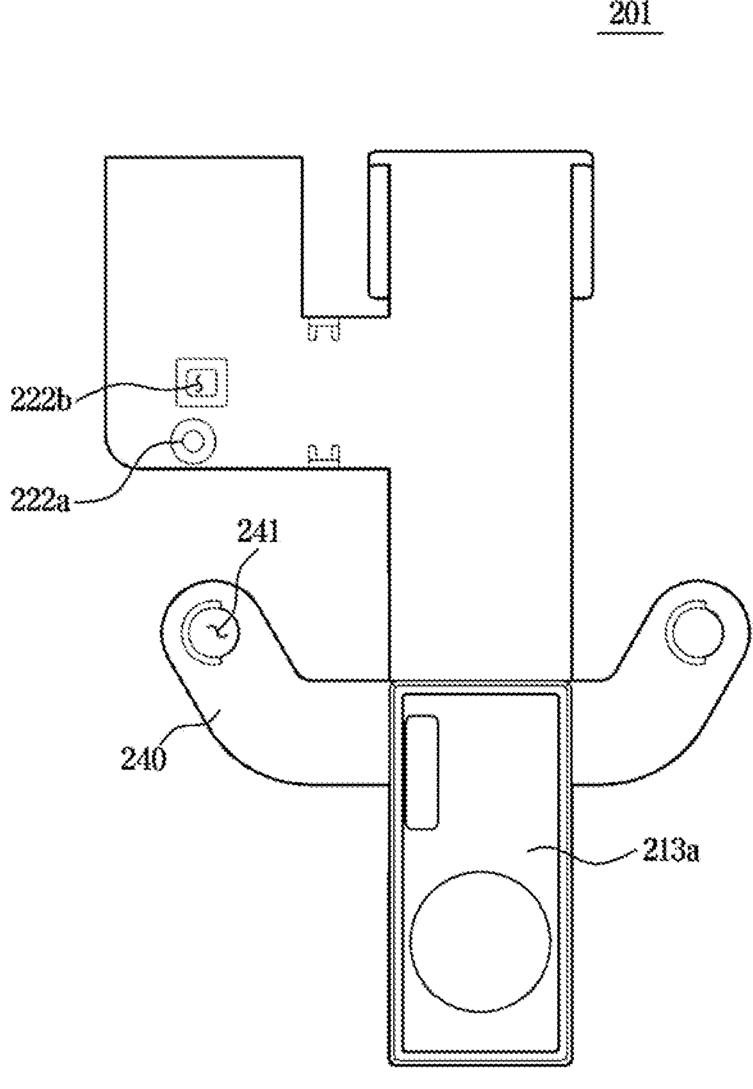
FIG. 9 is a view illustrating a rear surface of a sensor cover of the sensor unit in FIG. 8.
Figure 10:
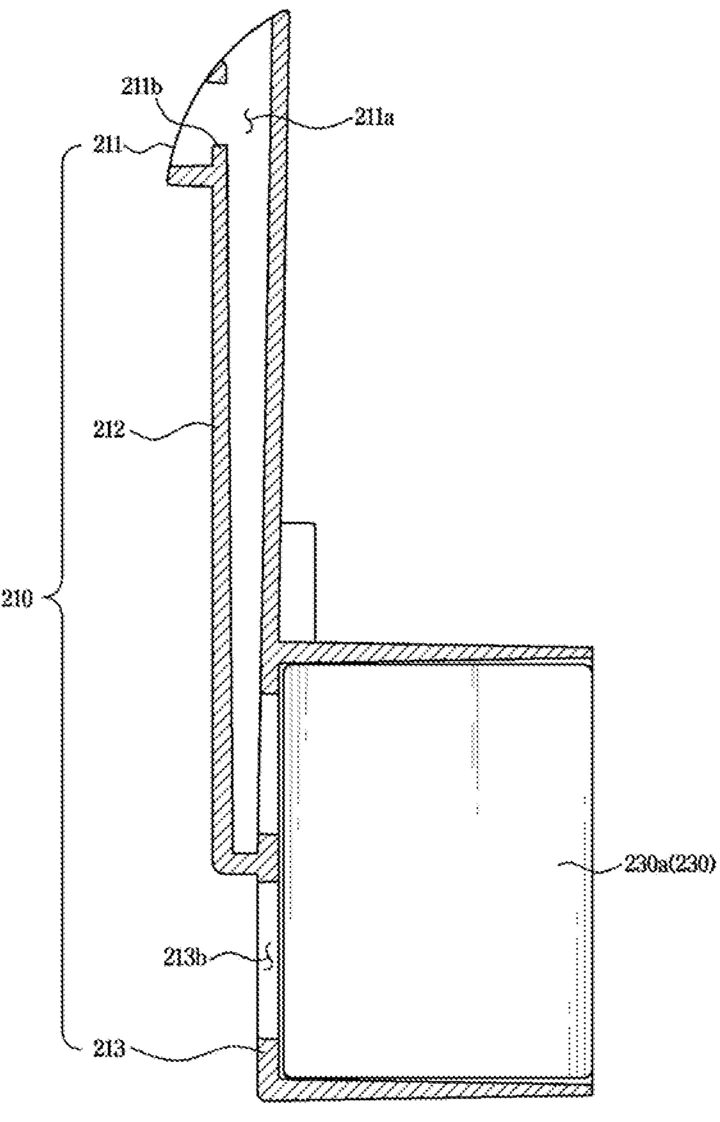
FIG. 10 is a cross-sectional view of a first cover of the sensor cover and a dust sensor in the air cleaner according to an embodiment of the present disclosure.
Figure 11:
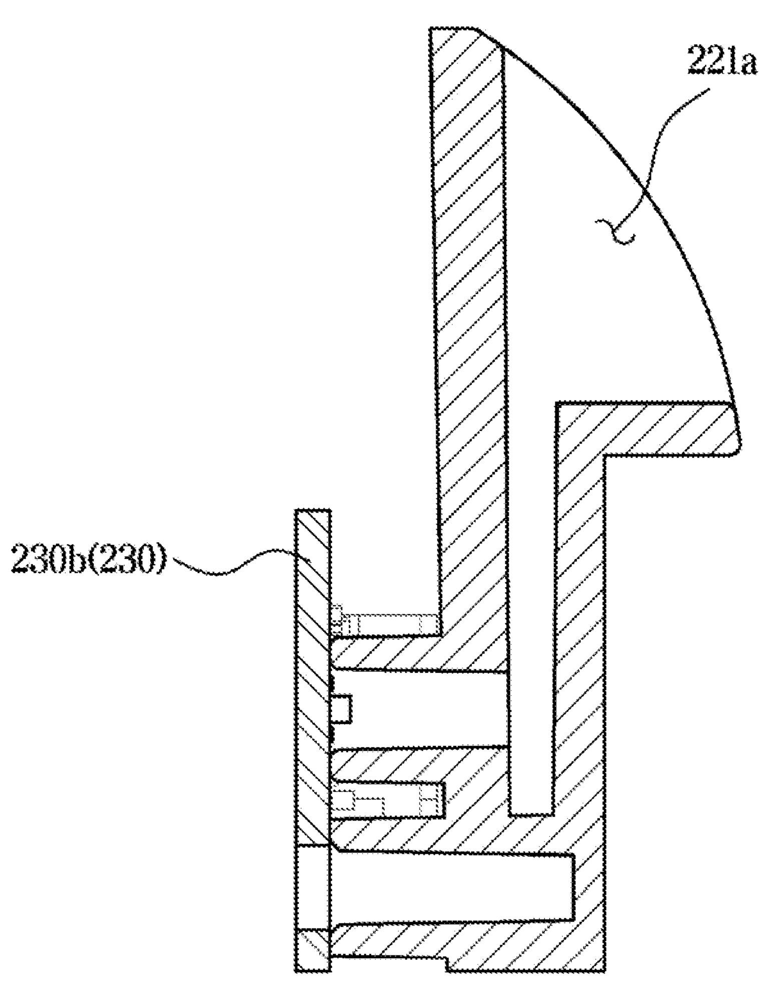
FIG. 11 is a cross-sectional view of a second cover of the sensor cover and the dust sensor in the air cleaner according to an embodiment of the present disclosure.
Figure 12:
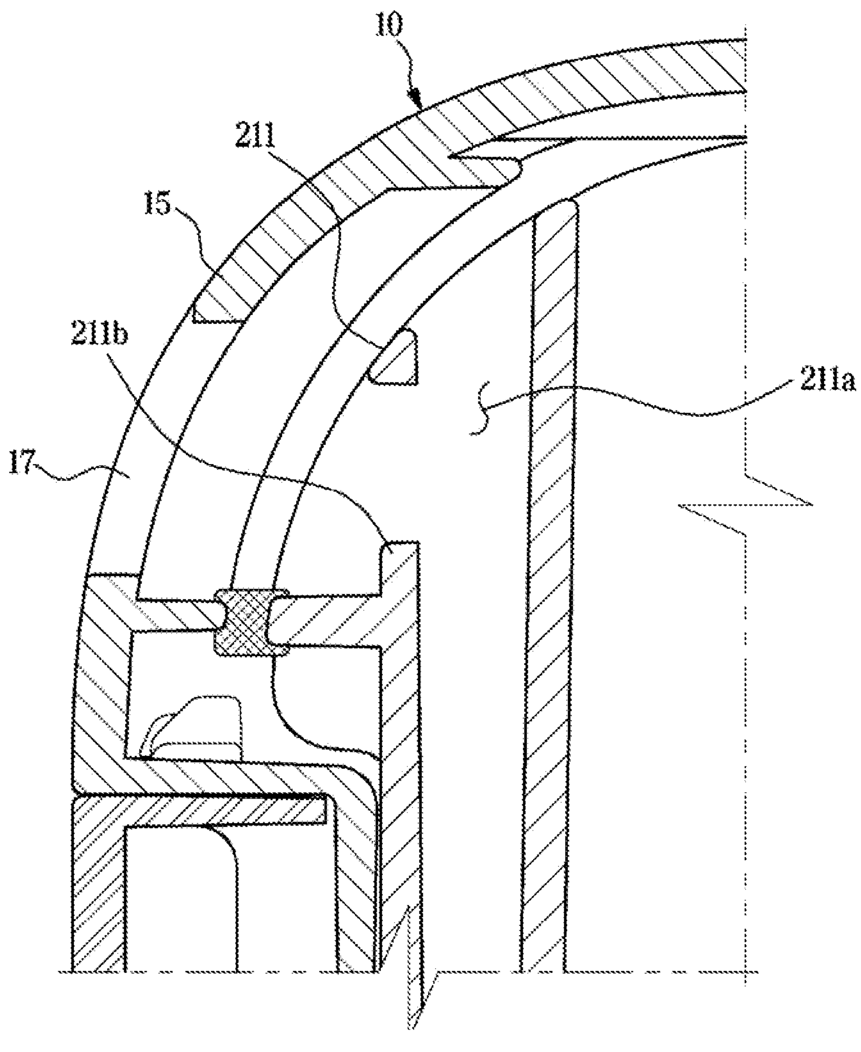
FIG. 12 is a cross-sectional view taken along line I-I' in the sensor unit of FIG. 8.

FIG. 8 is an exploded perspective view of a sensor unit in the air cleaner according to an embodiment of the present disclosure, FIG. 9 is a view illustrating a rear surface of a sensor cover of the sensor unit in FIG. 8, FIG. 10 is a cross-sectional view of a first cover of the sensor cover and a dust sensor in the air cleaner according to an embodiment of the present disclosure, FIG. 11 is a cross-sectional view of a second cover of the sensor cover and the dust sensor in the air cleaner according to an embodiment of the present disclosure, and FIG. 12 is a cross-sectional view taken along line I-I' in the sensor unit of FIG. 8.

Referring to FIGS. 8 to 11, the sensor unit 200 includes a sensor cover 201 and at least one sensor 230 provided inside the sensor cover 201 to measure the degree of contamination of air around the air cleaner 1. The sensor unit 200 may include two or more sensors.

When the sensor unit 200 includes two or more sensors, the sensor cover 201 may include a plurality of inlet parts 211 and 221 provided to introduce air into the sensors, respectively, and a plurality of flow path parts 212 and 222 provided such that the air introduced into the plurality of inlet parts 211 and 221 may move.

The sensor unit 200 may include at least one of a dust sensor 230*a* to measure dust concentration in air and a gas sensor 230*b* to measure gas concentration in air.

When the sensor unit 200 includes the dust sensor 230*a* and the gas sensor 230*b*, the sensor cover 201 may include a first cover 210 provided with the dust sensor 230*a* and a second cover 220 provided with the gas sensor 230*b*. The dust sensor 230*a* may be provided on the first cover 210 and the gas sensor 230*b* may be provided on the second cover 220. As will be described later, the dust sensor 230*a* may be accommodated inside the first cover 210 and the gas sensor 230*b* may be coupled to a rear surface of the second cover 220.

In addition, the sensor cover 201 may include a connection member 205, to connect the first cover 210 and the second cover 220, between the first cover 210 and the second cover 220. The first cover 210 and the second cover 220 may be connected to each other by the connection member 205. The first cover 210, the second cover 220 and the connection member 205 may be integrally formed.

Referring back to FIG. 3, the sensor unit 200 may be provided below the sensor air inlet 17. The sensor unit 200 may be disposed adjacent to the sensor air inlet 17 so that the air passed through the sensor air inlet 17 is introduced into the inside thereof. That is, the sensor unit 200 may be provided adjacent to the round portion 15 on which the sensor air inlet 17 is provided.

More specifically, the first cover 210 includes a first inlet part 211, the first flow path part 212, and an accommodating part 213, and the second cover 220 includes the second inlet part 221 and the second flow path part 222.

The first inlet part 211 of the first cover 210 may include a first inlet port 211*a* through which air is introduced to measure the concentration of dust in the air. In order to allow air passed through the sensor air inlet 17 provided on the round portion 15 to be easily introduced into the first cover 210, the first inlet part 211 may be provided adjacent to the round portion 15. In this case, the first inlet part 211 may have a shape curved along the round portion 15.

In addition, in order to prevent foreign substances passed through the sensor air inlet 17 from being introduced into the first inlet part 211, the first inlet port 211*a* may be formed to be opened in a lateral direction of the case 10. That is, in order to prevent foreign substances passed through the sensor air inlet 17 from being introduced into the sensor unit 200 located below the sensor air inlet 17, the first inlet port 211*a* may be opened in the lateral direction instead of a vertical direction.

Referring to FIG. 12, a rib 211*b* may be provided to form a step inside the first inlet port 211*a* to prevent foreign substances from being introduced into the first inlet port 211*a*. Accordingly, when foreign substances are introduced into the first inlet port 211*a*, the foreign substances may be prevented from being introduced into the first flow path part 212 by the rib 211*b*.

The first flow path part 212 of the first cover 210 connects the first inlet part 211 and the accommodating part 213. The accommodating part 213 of the first cover 210 accommodates the dust sensor 230*a* therein. The accommodating part 213 may be provided in a hexahedral shape. However, the accommodating part 213 is not limited thereto, and may have any shape as long as it may accommodate the dust sensor 230*a*. The dust sensor 230*a* may be accommodated in the accommodating part 213 through an open side 213*a* (see FIG. 9) thereof. The accommodating part 213 may be provided on a rear side of the first flow path part 212 to communicate with the first flow path part 212. Air flowing along the first flow passage 212 may be introduced into the accommodating part 213.

The first flow path part 212 is connected to the first inlet part 211 and has a space therein so that the air introduced into the first inlet part 211 moves to the accommodating part 213. The dust sensor 230*a* measures the concentration of dust contained in air moved to the accommodating part 213. The dust sensor 230*a* may measure the degree of contamination of air by measuring the concentration of dust in the air.

More specifically, the dust sensor 230*a* includes a casing 231*a*, a suction port 232*a*, a dust sensing part 233*a*, and a discharge port 234*a*.

The casing 231*a* may be provided in a hexahedral shape. The suction port 232*a* through which air is introduced may be formed on one side of the casing 231*a*. As illustrated in FIG. 8, a plurality of the suction ports 232*a* may be provided. Air introduced into the accommodating part 213 may be introduced into the casing 231*a* through the suction ports 232*a* of the dust sensor 230*a*. The dust sensing part 233*a* measures the concentration of dust in air introduced into the casing 231*a*. Air in which concentration of dust is measured by the dust sensing part 233*a* is discharged to the outside through a discharge port 234*a* provided on the other side of the casing 231*a*. A hole 213*b* may be provided at a position corresponding to the discharge port 234*a* on the other side of the accommodating part 213. Accordingly, air passed through the discharge port 234*a* may be discharged to the outside of the sensor cover 201 through the hole 213*b* provided on the accommodating part 213.

A fan 235*a* may be provided inside the casing 231*a* to flow air. The fan 235*a* serves to suck air passed through the sensor air inlet 17 so that the air passed through the sensor air inlet 17 is introduced into the first inlet part 211.

The second inlet part 221 of the second cover 220 includes a second inlet port 221*a* through which air is introduced so that the gas sensor 230*b* measures the gas concentration in the air. The second flow path part 222 of the second cover 220 is connected to the second inlet part 221 and has a space therein so that air introduced into the second inlet port 221*a* may move. A coupling member 222*a* (see FIG. 9) may be provided on a rear surface of the second flow path part 222 so that the gas sensor 230*b* may be coupled thereto. In addition, a passing hole 222*b* (see FIG. 9) communicating with the gas sensor 230*b* to allow air to reach the gas sensor 230*b* may be provided on the rear surface of the second flow path part 222. The gas sensor 230*b* may measure the gas concentration contained in air.

Like the first inlet part 211, the second inlet part 221 may have a shape curved along the round portion 15 so that the air passed through the sensor air inlet 17 provided on the round portion 15 is easily introduced into the second cover 220.

In addition, like the first inlet port 211*a*, in order to prevent foreign substances passed through the sensor air inlet 17 from being introduced into the second inlet part 221, the first inlet port 211*a* may be formed to be opened in the lateral direction of the case 10. That is, in order to prevent foreign substances passed through the sensor air inlet 17 from being introduced into the sensor unit 200 located below the sensor air inlet 17, the second inlet port 221*a* may be opened in the lateral direction instead of the vertical direction, and thus only air may be introduced into the second cover 220 through the second inlet port 221*a*.

Figure 13:
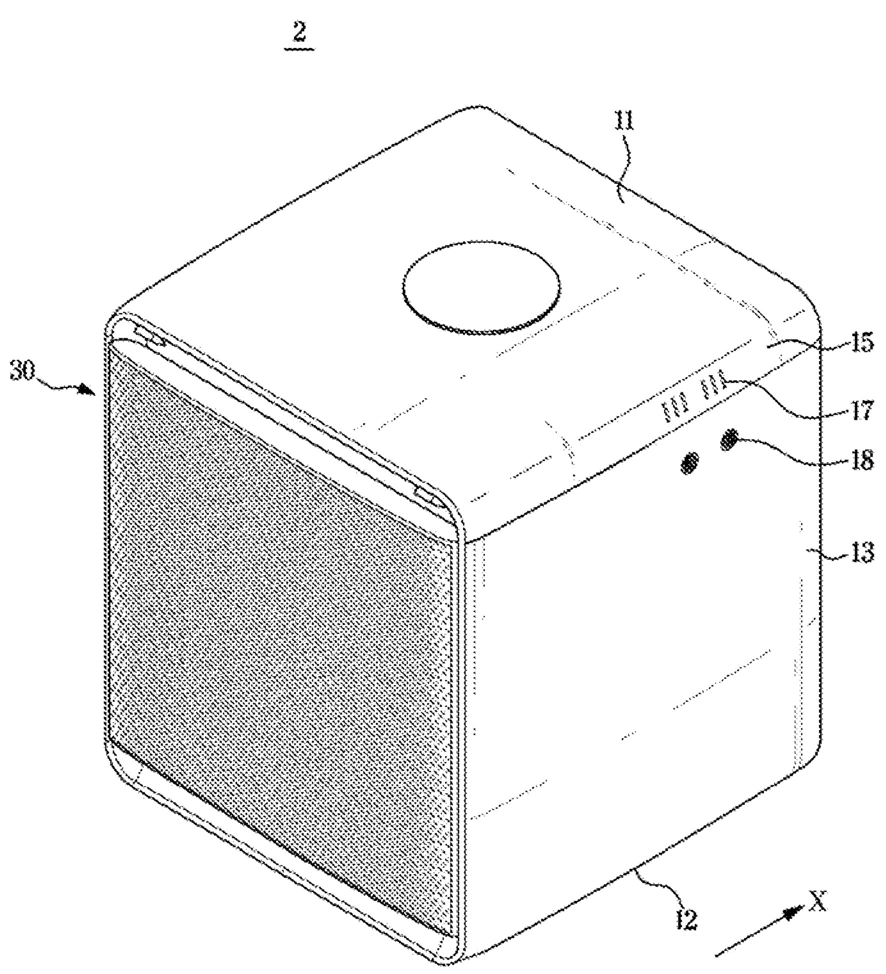
FIG. 13 is a perspective view of an air cleaner according to another embodiment of the present disclosure.
Figure 14:
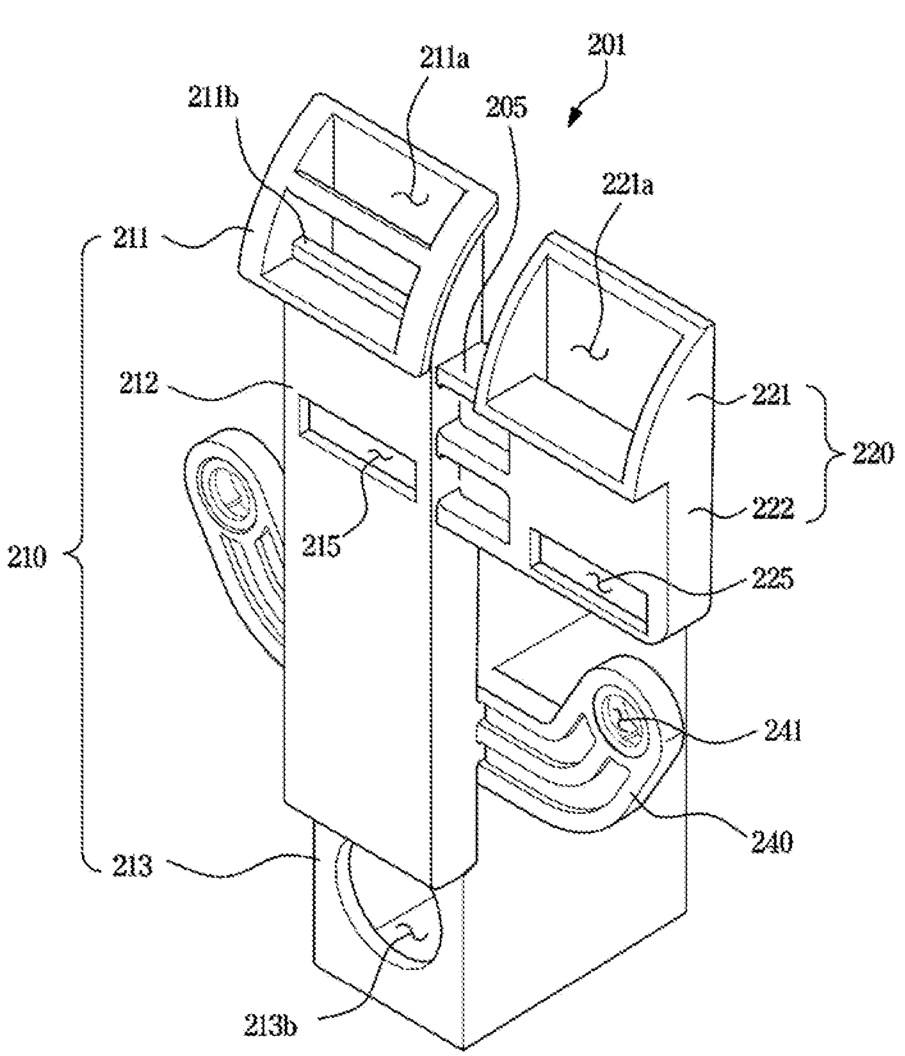
FIG. 14 is a perspective view of a sensor unit in the air cleaner according to another embodiment of the present disclosure.
Figure 15:
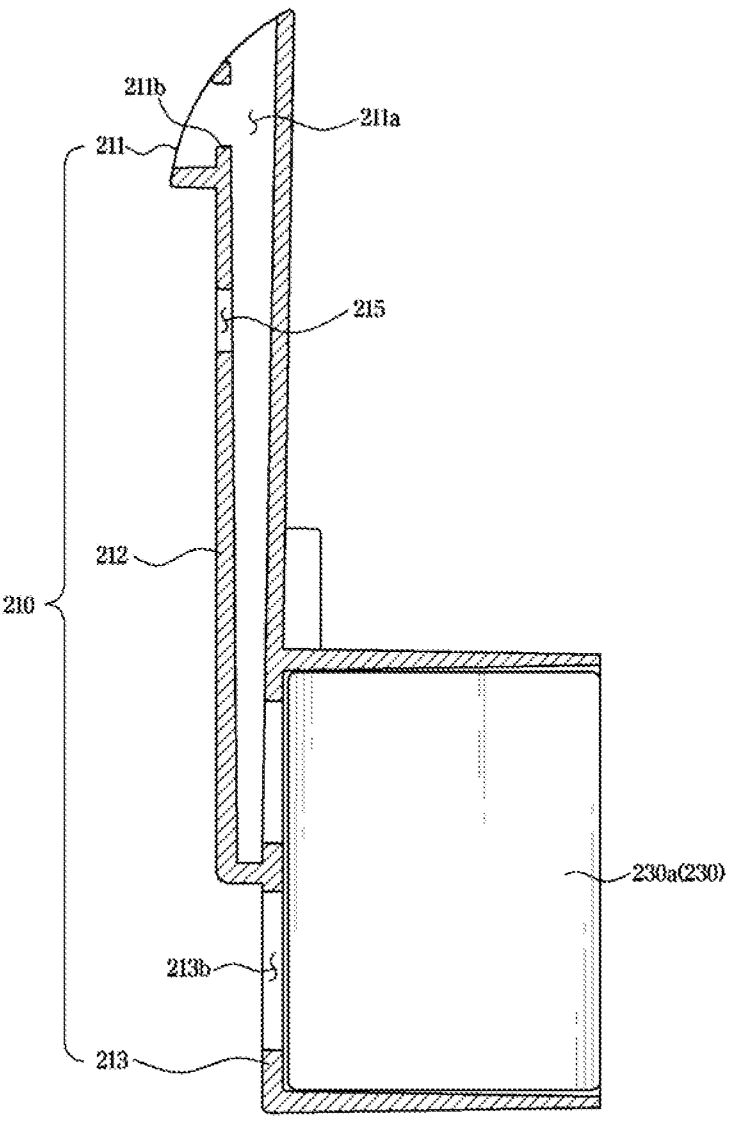
FIG. 15 is a cross-sectional view of a first cover of a sensor cover and a dust sensor in the air cleaner according to another embodiment of the present disclosure.
Figure 16:
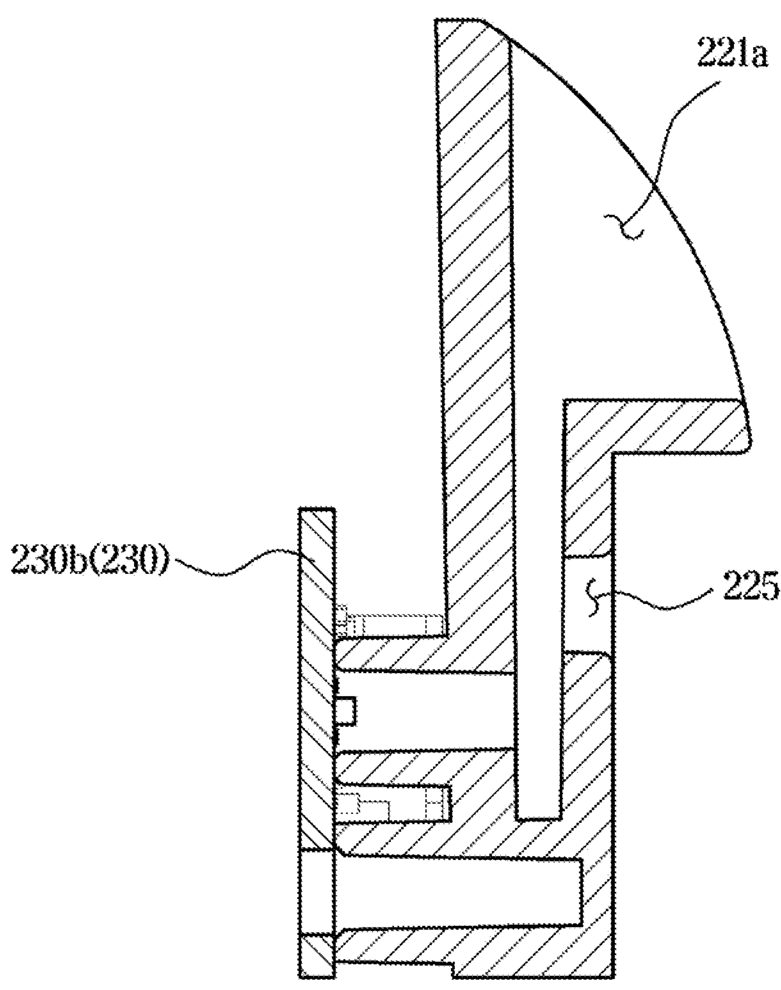
FIG. 16 is a cross-sectional view of a second cover of the sensor cover and the dust sensor in the air cleaner according to another embodiment of the present disclosure.

FIG. 13 is a perspective view of an air cleaner according to another embodiment of the present disclosure, FIG. 14 is a perspective view of a sensor unit in the air cleaner according to another embodiment of the present disclosure, FIG. 15 is a cross-sectional view of a first cover of a sensor cover and a dust sensor in the air cleaner according to another embodiment of the present disclosure, and FIG. 16 is a cross-sectional view of a second cover of the sensor cover and the dust sensor in the air cleaner according to another embodiment of the present disclosure.

Because an air cleaner 2 according to this embodiment has the same configuration as the air cleaner 1 described with reference to FIGS. 1 to 12 except that an air inlet hole 18 is provided on a side surface of the case 10 and openings 215 and 225 are provided on the first flow path part 212 of the first cover 210 and the second flow path part 222 of the second cover 220, respectively, overlapping descriptions will be omitted.

Referring to FIGS. 13 to 16, the air inlet hole 18 may be provided on the side surface of the case 10 to allow air to be introduced therethrough. The degree of contamination of the air introduced through the air inlet hole 18 may be measured by the sensor unit 200.

When the air cleaner 2 is installed on a wall surface, the air inlet hole 18 is closed by the wall surface so that air may not pass therethrough. In this case, the sensor air inlet 17 provided on the round portion 15 may not be closed. Therefore, the sensor unit 200 may measure the degree of contamination of air around the air cleaner by measuring the degree of contamination of air passed through the sensor air inlet 17 provided on the round portion 15.

That is, even when the air inlet hole 18 is closed as a side surface of the air cleaner 2 is located to be in close contact with the wall surface, the degree of contamination of air may be sensed by allowing the air to be introduced into the sensor unit 200 through the sensor air inlet 17.

When the air inlet hole 18 is not closed, air passed through the air inlet 18 and the sensor air inlet 17 is introduced into the sensor unit 200, so that the degree of contamination of the air by the sensor unit 200 may be measured more efficiently.

In order for air passed through the air inlet hole 18 to be introduced into the sensor unit 200, an opening may be provided at a position corresponding to the air inlet hole 18 on each of the first flow path part 212 of the first cover 210 and the second flow path part 222 of the second cover 220. The air passed through the air inlet hole 18 is introduced into the first cover 210 and the second cover 220 through the opening 215 of the first flow path part 212 and the opening 225 of the second flow path part 222, so that the dust concentration and the gas concentration may be measured by the dust sensor and the gas sensor, respectively.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

What is claimed is:

1. An air cleaner comprising:

a case comprising an upper surface and a side surface;

a sensor unit to measure a degree of contamination of air introduced into the case;

a round portion that is curved between the upper surface of the case and the side surface of the case; and a sensor air inlet, on the round portion, through which the air is introduced into the case, wherein the sensor unit comprises a dust sensor, a gas sensor and a sensor cover, the sensor cover having a first cover in which the dust sensor is provided and a second cover in which the gas sensor is provided, the first cover comprises:

a first inlet part having a first inlet port opened along a lateral direction of the case, a first flow path part connected to the first inlet part so that air introduced through the first inlet port reaches the dust sensor, and an accommodating portion connected to the first flow path part to accommodate the dust sensor, a discharge hole corresponding to a discharge port of the dust sensor so that air discharged from the dust sensor is discharged to an outside of the sensor cover, and a second cover comprises:

a second inlet part through which air is introduced so that the gas sensor measures a concentration of gas in the air, and a second flow path part connected to the second inlet part so that the introduced air reaches the gas sensor.

2. The air cleaner according to claim 1, wherein the sensor cover further comprises a connection member to connect the first cover and the second cover so that the first cover and the second cover are integrally formed.

3. The air cleaner according to claim 1, wherein the first inlet part has a shape curved along the round portion.

4. The air cleaner according to claim 1, wherein the first inlet part comprises a rib that forms a step inside the first inlet port to prevent foreign substances from being introduced into the first inlet port.

5. The air cleaner according to claim 1, wherein one side of the accommodating portion is open such that the dust sensor is inserted therethrough.

6. The air cleaner according to claim 1, wherein the dust sensor comprises:

a casing;

a suction port on one side of the casing to allow the air to be introduced therethrough;

a dust sensing part inside the casing to measure the concentration of dust in the air; and a discharge port on another side of the casing through which the air is discharged subsequent to the concentration of dust being measured by the dust sensing part.

7. The air cleaner according to claim 6, wherein the dust sensor further comprises a fan inside the casing to suck the air into the suction port.

8. The air cleaner according to claim 1, wherein the second inlet part has a shape curved along the round portion.

9. The air cleaner according to claim 1, wherein the case comprises:

a front surface, the upper surface, a back surface and the side surface having an outlet, the back surface having an inlet, a fan arranged to draw air through the inlet, and a filter arranged to filter the air drawn through the fan into the inlet.

* * * * *